United States Patent [19]

Marler

[11] Patent Number: 5,228,090
[45] Date of Patent: Jul. 13, 1993

[54] TRUCK REAR WINDOW SPEAKER APPARATUS

[76] Inventor: Michael K. Marler, P.O. Box 1158, Candler, N.C. 28715

[21] Appl. No.: 877,999

[22] Filed: May 4, 1992

[51] Int. Cl.$^5$ .................. H04B 1/00; H04R 1/02; H04R 25/00
[52] U.S. Cl. .................................. 381/86; 381/90; 381/188; 381/205
[58] Field of Search ............... 381/86, 88, 90, 205, 381/188

[56] References Cited

U.S. PATENT DOCUMENTS 5,008,944 4/1991 Sels et al. ..................... 381/86
5,094,316 3/1992 Rosen ........................... 381/205

Primary Examiner—Jin F. Ng
Assistant Examiner—Ping Wong
Attorney, Agent, or Firm—Leon Gilden

[57] ABSTRACT

A truck rear window includes a first window plate and second window plate, each including a window plate opening to pivotally mount at least one speaker housing therewithin. The speaker housing includes a speaker therewithin and is pivotally arranged to permit projection of sound to an interior passenger compartment of a truck cab or rearwardly relative to the truck bed to project music exteriorly of the truck cab. The speaker housings each include diametrically aligned axles directed into respective window plates of the truck window and a frictional perimeter covering to effect weather strip sealing, as well as frictional engagement relative to the window opening of each respective speaker. The truck window may include a central plate arranged for disengagement relative to the first and second window plates to permit ventilation through the truck cab.

7 Claims, 5 Drawing Sheets

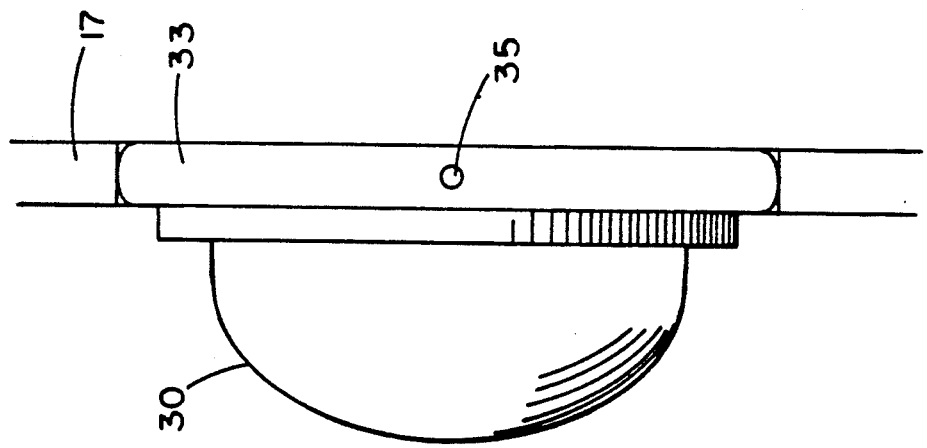
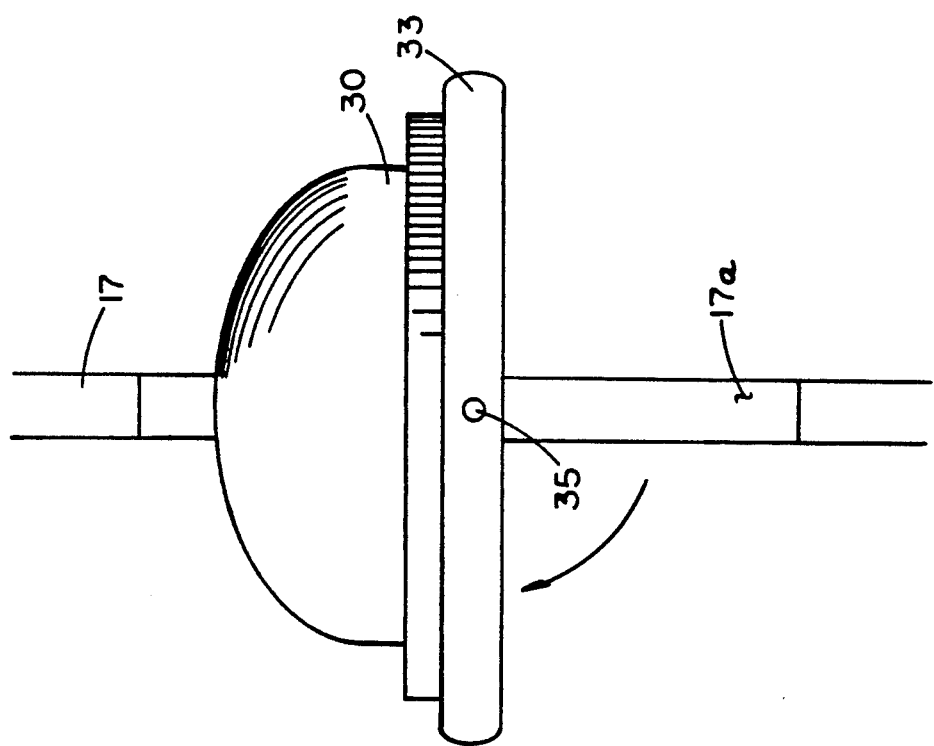
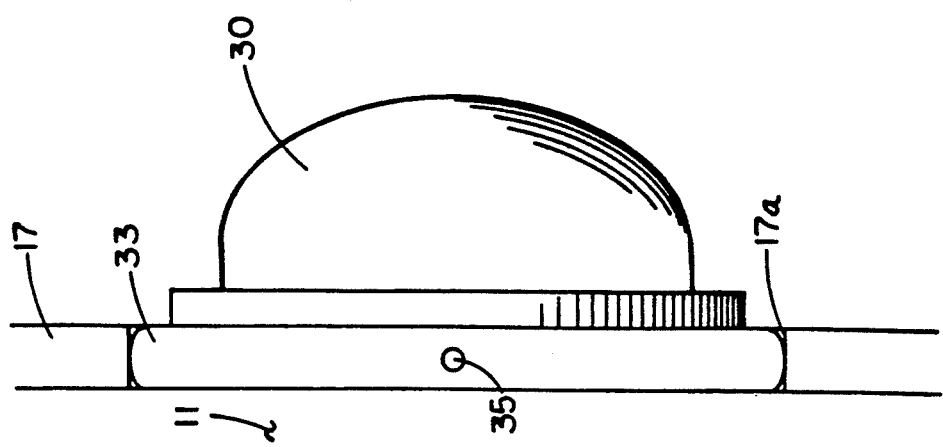

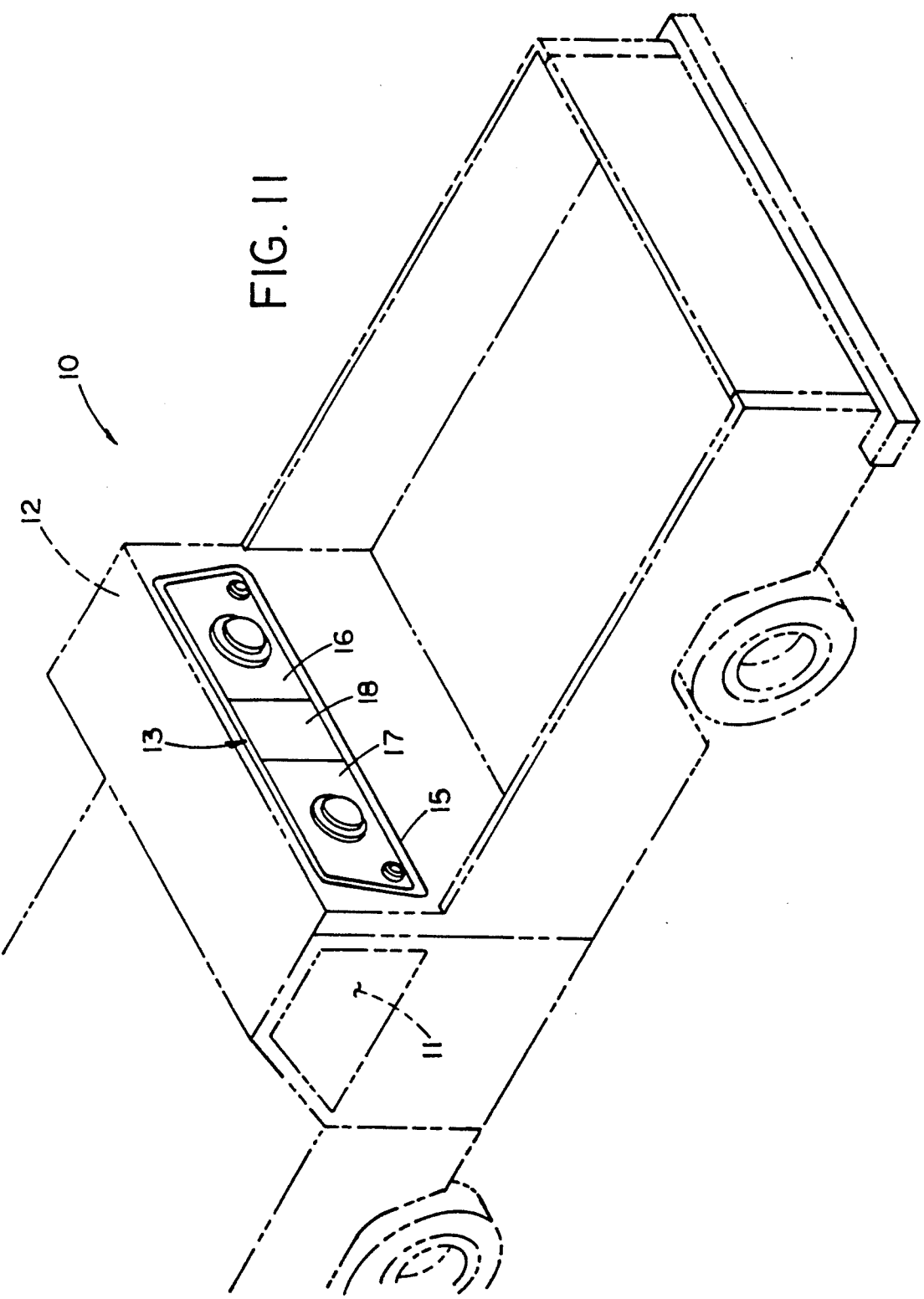

TRUCK REAR WINDOW SPEAKER APPARATUS

BACKGROUND OF THE INVENTION

1. Field of the Invention

The field of invention relates to truck speaker apparatus, and more particularly pertains to a new and improved truck rear window speaker apparatus wherein the same is arranged to permit selective directing of music and the like interiorly or exteriorly of a truck cab.

21. Description of the Prior Art

Truck speaker arrangements are typically arranged to provide music interiorly of the truck bed, but with contemporary use of trucks as sport vehicles and the like, individuals to project music exteriorly of the truck bed during various festive occasions are precluded from orienting such music exteriorly of the truck. The instant invention attempts to overcome deficiencies of the prior art by permitting directional positioning of the truck speakers when mounted within the modified window structure of the truck.

Prior art vehicular mounting of speakers relative to interior panels is exemplified in the U.S. Pat. No. 4,267,993 to Shimizu, et al. mounting the speaker relative to a body panel.

U.S. Pat. No. 4,905,860 to Kurihra sets forth a speaker box arranged for mounting within a vehicular door.

U.S. Pat. No. 4,924,965 to Murayama, et al. sets forth a speaker system arranged for mounting within a dashboard component of a vehicle.

U.S. Pat. No. 4,877,105 to Mugikura sets forth a rear speaker unit for a motor vehicle and fixedly mounted in a disposed space between a rear seat and vehicle body side panel.

U.S. Pat. No. 4,551,849 to Kassia, et al. sets forth a vehicle panel speaker wherein the panel is formed as a portion of the sound-producing enclosure for the speaker utilizing speaker vibrations to effect vibration of the associated panel.

As such, it may be appreciated that there continues to be a need for a new and improved truck rear window speaker apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of vehicular speaker apparatus now present in the prior art, the present invention provides a truck rear window speaker apparatus wherein the same is arranged for pivotally mounting within various panels of a truck rear window. As such, the general purpose of the present invention, which will be described subsequently in greater detail, is to provide a new and improved truck rear window speaker apparatus which has all the advantages of the prior art vehicular speaker apparatus and none of the disadvantages.

To attain this, the present invention provides a truck rear window including a first window plate and second window plate, each including a window plate opening to pivotally mount at least one speaker housing therewithin. The speaker housing includes a speaker therewithin and is pivotally arranged to permit projection of sound to an interior passenger compartment of a truck cab or rearwardly relative to the truck bed to project music exteriorly of the truck cab. The speaker housings each include diametrically aligned axles directed into respective window plates of the truck window and a frictional perimeter covering to effect weather strip sealing, as well as frictional engagement relative to the window opening of each respective speaker. The truck window may include a central plate arranged for disengagement relative to the first and second window plates to permit ventilation through the truck cab.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck rear window speaker apparatus which has all the advantages of the prior art vehicular speaker apparatus and none of the disadvantages.

It is another object of the present invention to provide a new and improved truck rear window speaker apparatus which may be easily and efficiently manufactured and marketed.

It is a further object of the present invention to provide a new and improved truck rear window speaker apparatus which is of a durable and reliable construction.

An even further object of the present invention is to provide a new and improved truck rear window speaker apparatus which is susceptible of a low cost of manufacture with regard to both materials and labor, and which accordingly is then susceptible of low prices of sale to the consuming public, thereby making such truck rear window speaker apparatus economically available to the buying public.

Still yet another object of the present invention is to provide a new and improved truck rear window speaker apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the positioning of a speaker within a rear window panel in a first position.

FIG. 4 is an orthographic side view, partially in section, of the speaker in a second position rotative relative to the window opening.

FIG. 5 is an orthographic side view of the speaker mounted within the truck window panel in a second position rotated relative to the first position of FIG. 3.

FIG. 11 is an isometric illustration of the invention mounted within a truck vehicle.

DESCRIPTION OF THE PREFERRED EMBODIMENT

Figure 1:
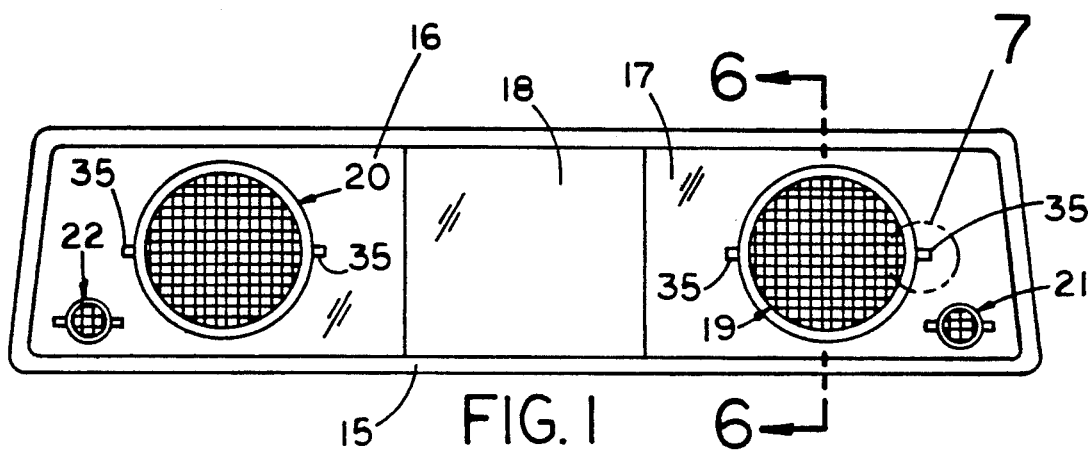
FIG. 1 is an orthographic view, taken in elevation, of the truck rear window.
Figure 2:
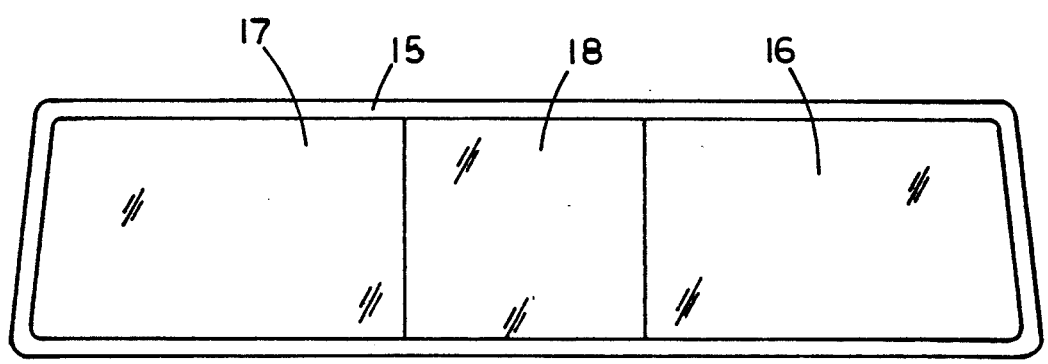
FIG. 2 is an isometric illustration of the truck rear window prior to installation and orientation of the speakers therewithin.
Figure 6:
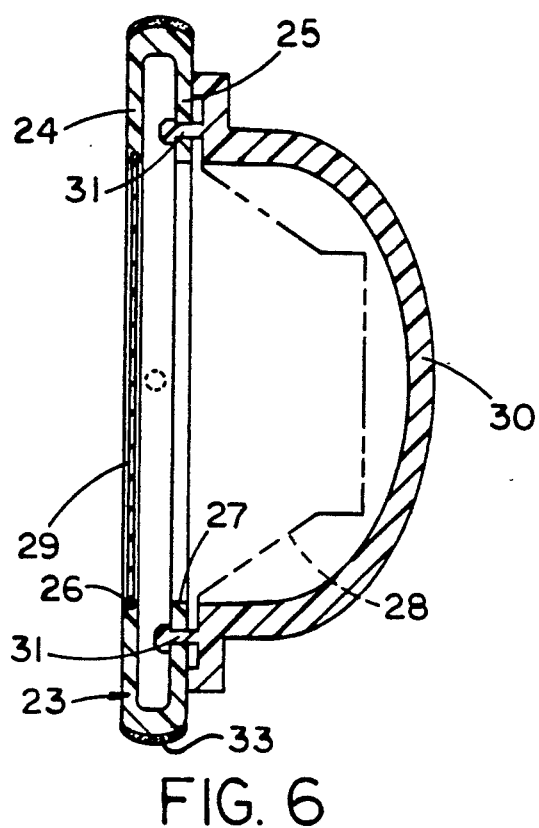
FIG. 6 is an orthographic view, taken along the lines 6—6 of FIG. 5 in the direction indicated by the arrows.
Figure 7:
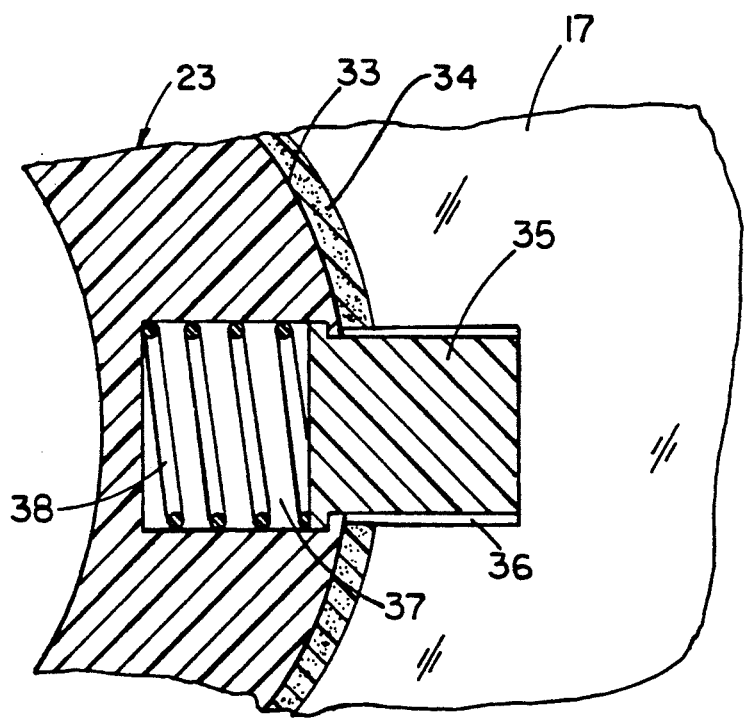
FIG. 7 is an orthographic cross-sectional illustration of section 7 as set forth in FIG. 1.

With reference now to the drawings, and in particular to FIGS. 1 to 11 thereof, a new and improved truck rear window speaker apparatus embodying the principles and concepts of the present invention and generally designated by the reference numeral 10 will be described.

More specifically, the truck rear window speaker apparatus 10 of the instant invention essentially comprises the organization positioned within a truck cab 12 that includes a passenger compartment 11. A rear window 13 is mounted through a rear wall of the truck cab 12 and is positioned above and forwardly of the truck bed. The rear window 13 includes a continuous window frame 15 in surrounding relationship relative to the rear window 13. The window includes a transparent first window plate 16 spaced from a transparent second window plate 17. A transparent central window plate 18 is positioned medially of the first and second window plates 16 and 17.

A first speaker assembly 19 and a second speaker assembly 20 are mounted respectively within the first and second window plates 16 and 17 and arranged for pivotal mounting therewithin. If desired, additional speaker assemblies such as exemplified by third and fourth speaker assemblies 21 and 22 mounted within respective first and second window plates 16 and 17 may be provided. Each of the speaker assemblies to include the first and second speaker assemblies 19 and 20 are of identical construction when mounted within the window plates. The speaker assemblies are mounted for rotation from a first position to project music interiorly of a passenger compartment, as illustrated in FIG. 3, to a second position to project music exteriorly of the passenger compartment towards the truck bed, in a manner as illustrated in FIG. 5, wherein the speaker assembly is arranged for rotation about a pair of diametrically aligned pivot axles 35 projecting into a respective window plate, to be described in more detail below.

Each speaker assembly includes a cylindrical mounting frame 23. The mounting frame includes a forward frame plate 24 spaced from and parallel a rear frame plate 25. A forward frame plate opening 26 is concentric with a rear plate opening 27. The speaker assembly 28 is fixedly mounted to the rear mounting frame plate 25 oriented towards the forward mounting frame plate 24. A speaker grill cover 29 is mounted within the forward plate opening 26, with the rear plate opening 27 arranged for receiving music and audible projection from the speaker assembly 28. Accordingly, the forward and rear plate openings 26 and 27 respectively are of substantially identical diametrically defined openings. A speaker covering cap 30 that includes covering cap legs 31 projecting into the rear mounting frame plate 25 in surrounding relationship relative to the speaker assembly or speaker member 28 affords protection and covering relative to the speaker member 28. It should be noted that the speaker member 28 is of a conventional construction utilizing a magnetic case, a diaphragm transmitting plate, and the like.

The cylindrical mounting frame 23 includes a mounting frame cylindrical side wall 33 that includes a side wall covering sheath 34 coextensive therewith informed of resilient polymeric sealing material to enhance frictional sealing between the window plate and the mounting frame 23.

A pair of diametrically aligned pivot axles 35 are fixedly mounted to the mounting frame 23 extending exteriorly thereof into an associated window plate. It should be noted that each window plate such as the second window plate 17, as illustrated in the FIG. 4, includes a window plate opening, such as the second window plate opening 17a, complementarily receiving the mounting frame 23 therewithin for permitting sealing of the covering sheath 34 relative to the associated window plate.

Each of the pivot axles 35 is received within an axle receiving socket 36, whereas each window plate includes a plurality of such sockets that are diametrically aligned within the window plate. The axle includes an axle mounting socket 37 within the mounting frame 23 and is reciprocatably mounted therewithin to include a biasing spring 38 captured between a floor of the axle mounting socket 37 and the pivot axle 35 to project each axle relative to each axle receiving socket 36 to provide for enhanced frictional engagement and positioning of each of the respective first and second speaker assemblies within their respective first and second window plate openings.

Figure 8:
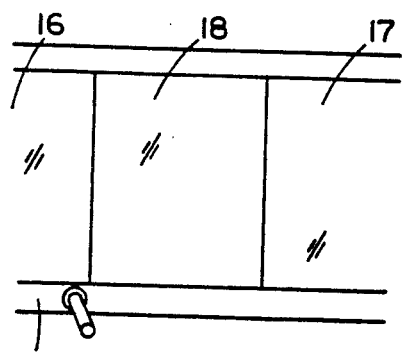
FIG. 8 is an orthographic view, taken in elevation, of the central panel of the truck rear window arranged for displacement relative to the first and second panels
Figure 9:
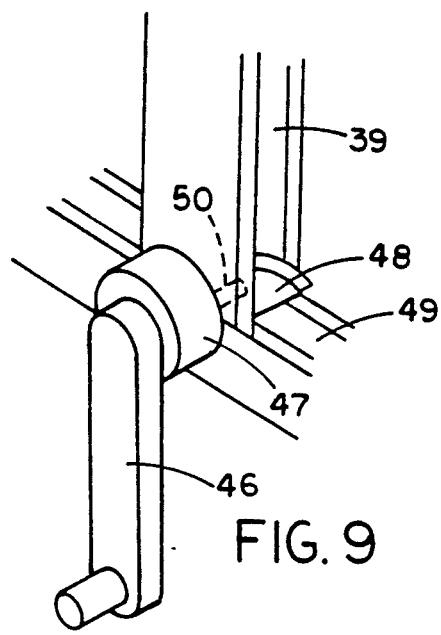
FIG. 9 is an isometric illustration of the window latch structure utilized by the central panel.
Figure 10:
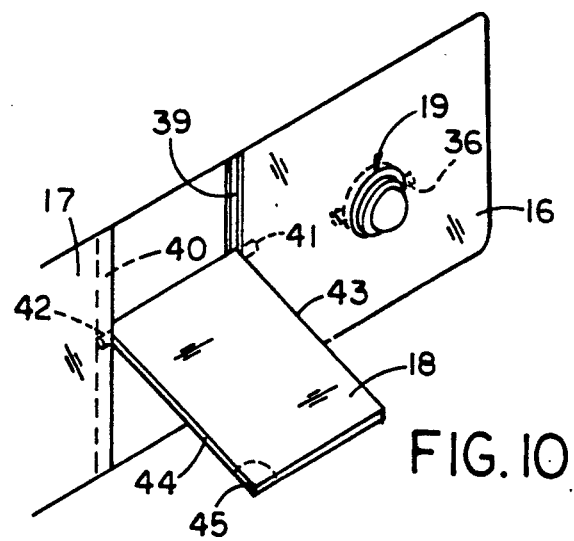
FIG. 10 is an isometric illustration of the central window panel displaced relative to the first and second window panel.

The FIGS. 8-10 illustrate the use of the central plate 18 arranged for displacement relative to the window frame to permit ventilation within the truck cab. A respective first and second window plate guide track 39 and 40 are formed within the first and second window plates 16 and 17. A central window plate first axle 41 and a central window plate second axle 42 are orthogonally mounted to the respective central window plates first and second side walls 43 and 44, as the first and second window plate axles 41 and 42 project within the respective first and second window plate guide tracks 39 and 40 to permit sliding mounting of the central window plate within the frame 15. A latch receiving cavity 45 is formed within the central window plate second side wall 44 adjacent a bottom wall thereof to receive a latch flange 48 fixedly mounted to a latch axle 50. The latch axle 50 projects through the window 16 within the compartment 11 and is mounted to a latch handle boss 47 that in turn includes a latch handle 46 to permit selective rotation of the latch boss and the latch flange 48 into selective positioning within the latch receiving cavity 45 to permit selective securing of the central window plate 18 within the window frame or its release therefrom to permit ventilation within the passenger compartment of the associated vehicle. It should be further noted that the frame 15 includes a latch flange receiving groove 49 to accommodate the latch flange in a displaced orientation relative to the central window plate to permit rotation of the latch flange 48 relative to the central window plate in a latching and delatching procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck rear window speaker apparatus mounted within a truck cab, wherein the truck cab includes a passenger compartment and a rear window mounted within the truck cab through a rear wall of the truck cab, and a truck bed positioned rearwardly and below the rear window, wherein the rear window comprises, a continuous window frame, with a transparent first window plate coplanar with a transparent second window plate within the window frame, wherein the first window plate is spaced from the second window plate and transparent central window plate positioned between the first window plate and the second window plate within the window frame, a first speaker assembly mounted within the first window plate, and a second speaker assembly mounted within the second window plate.

2. An apparatus as set forth in claim 1 wherein each speaker assembly of said first speaker assembly and said second speaker assembly includes a cylindrical mounting frame, and each cylindrical mounting frame includes a forward mounting plate spaced from a rear mounting plate, wherein the forward mounting plate and rear mounting plate are arranged in a parallel relationship relative to one another, and the forward mounting plate includes a forward plate opening, the forward plate opening including a speaker grill cover directed coextensively therewithin, and a speaker member fixedly mounted to the rear mounting plate coaxially aligned with a rear plate opening, with the speaker member extending rearwardly of the rear mounting plate, and a speaker covering cap arranged in surrounding relationship relative to the speaker member, the speaker covering cap fixedly secured to the rear mounting plate.

3. An apparatus as set forth in claim 2 wherein the mounting frame includes a mounting frame cylindrical side wall, and the side wall includes a polymeric resilient covering sheath arranged in coextensive relationship relative to the mounting frame side wall.

4. An apparatus as set forth in claim 3 wherein each window plate includes a window plate opening receiving one of said first and second speaker assemblies, wherein each window plate opening includes a plurality of diametrically aligned axle receiving sockets in communication with the window plate opening, and the cylindrical mounting frame includes a plurality of diametrically aligned pivot axles mounted to the cylindrical mounting frame, wherein the pivot axles are received within the axle receiving sockets.

5. An apparatus as set forth in claim 4 wherein each pivot axle is slidably mounted within an axle mounting socket within the cylindrical mounting frame, and each axle mounting socket within the cylindrical mounting frame includes an axle mounting socket floor, and a biasing spring captured between the floor and the pivot axle to bias each pivot axle into communication with each respective axle receiving socket.

6. An apparatus as set forth in claim 5 wherein the central window plate includes a central window plate first side wall spaced from and parallel a central window plate second side wall, and the first side wall is positioned adjacent the first window plate, and the second side wall is positioned adjacent the second window plate, and the first window plate includes a first window plate guide track, and the second window plate includes a second window plate guide track, the first side wall includes a central window plate first axle, the second side wall includes a central window plate second axle, wherein the central window plate first axle is received within the first window plate guide track and the central window plate second axle is received within the second window plate guide track to permit sliding of the central window plate relative to the first window plate and the second window plate.

7. An apparatus as set forth in claim 6 including a latch axle directed through the first window plate, with the latch axle terminating in a latch flange, the latch flange orthogonally oriented relative to the latch axle, and a latch handle boss mounted to the latch axle exteriorly of the rear window, and the latch boss including a latch handle fixedly mounted to the latch boss, and the central window plate including a central window plate bottom wall and a latch receiving cavity positioned through the central window plate first side wall adjacent the central window plate bottom wall to selectively receive the latch flange upon pivotment of the latch flange relative to the central window plate.

* * * * *